(12) United States Patent
Otomo et al.

(10) Patent No.: US 9,484,596 B2
(45) Date of Patent: Nov. 1, 2016

(54) BATTERY SYSTEM, METHOD FOR PRODUCING BATTERY SYSTEM, AND BATTERY CONTROL APPARATUS

(71) Applicant: TOYOTA JIDOSHA KABUSHIKI KAISHA, Toyota-shi, Aichi (JP)

(72) Inventors: Takamasa Otomo, Susono (JP); Koji Kawamoto, Miyoshi (JP); Yuki Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 14/409,224

(22) PCT Filed: May 14, 2013

(86) PCT No.: PCT/JP2013/063437
§ 371 (c)(1),
(2) Date: Dec. 18, 2014

(87) PCT Pub. No.: WO2013/190930
PCT Pub. Date: Dec. 27, 2013

(65) Prior Publication Data
US 2015/0147597 A1 May 28, 2015

(30) Foreign Application Priority Data

Jun. 20, 2012 (JP) .................. 2012-138815

(51) Int. Cl.
*H01M 10/0562* (2010.01)
*H01M 4/38* (2006.01)
(Continued)

(52) U.S. Cl.
CPC .......... *H01M 10/0562* (2013.01); *C01B 25/14* (2013.01); *H01M 4/134* (2013.01);
(Continued)

(58) Field of Classification Search
CPC ......... H01M 10/052; H01M 10/0562; H01M 10/425; H01M 10/44; H01M 2004/027; H01M 2010/4271; H01M 2300/0068; H01M 4/134; H01M 4/386; H01M 4/62; C01B 25/14; C01P 2002/72; Y02E 60/122; Y02P 70/54; Y02T 10/7011
See application file for complete search history.

(56) References Cited

U.S. PATENT DOCUMENTS

2012/0043942 A1   2/2012   Tamane et al.
2012/0052396 A1   3/2012   Tsuchida et al.
(Continued)

FOREIGN PATENT DOCUMENTS

EP      2 541 656 A1      1/2013
JP      A-2003-217663     7/2003
(Continued)

OTHER PUBLICATIONS

Kondo et al., "New Lithium Ion Conductors Based on $Li_2S$—$SiS_2$ System," *Solid State Ionics*, 1992, pp. 1183-1186.

*Primary Examiner* — Carlos Barcena
(74) *Attorney, Agent, or Firm* — Oliff PLC

(57) ABSTRACT

The object of the present invention is to provide a battery system in which reductive decomposition of a Ge-containing solid electrolyte material is restricted. The present invention attains the object by providing a battery system including a battery and a control apparatus, wherein the battery has a cathode active material layer containing a cathode active material, an anode active material layer containing a Si-containing anode active material, and an electrolyte layer formed between the cathode active material layer and the anode active material layer, at least one of the anode active material layer and the electrolyte layer contains a Ge-containing solid electrolyte material, and the control apparatus is an apparatus to control an electric potential of the Si-containing anode active material so as to be reduction potential or less of the Ge-containing solid electrolyte material.

9 Claims, 8 Drawing Sheets

(51) Int. Cl.
  *H01M 4/134* (2010.01)
  *H01M 10/052* (2010.01)
  *H01M 10/42* (2006.01)
  *H01M 4/62* (2006.01)
  *H01M 10/44* (2006.01)
  *C01B 25/14* (2006.01)
  *H01M 4/02* (2006.01)

(52) U.S. Cl.
  CPC ............ *H01M 4/386* (2013.01); *H01M 4/62* (2013.01); *H01M 10/052* (2013.01); *H01M 10/425* (2013.01); *H01M 10/44* (2013.01); *C01P 2002/72* (2013.01); *H01M 2004/027* (2013.01); *H01M 2010/4271* (2013.01); *H01M 2300/0068* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2012/0091966 A1 | 4/2012 | Mori |
| 2012/0231350 A1 | 9/2012 | Nishida et al. |
| 2013/0040208 A1 | 2/2013 | Kanno et al. |
| 2013/0273437 A1 | 10/2013 | Yoshioka et al. |

FOREIGN PATENT DOCUMENTS

| | | |
|---|---|---|
| JP | 2012-085487 A | 4/2012 |
| TW | 201037875 A | 10/2010 |
| WO | 2009/101506 A1 | 8/2009 |
| WO | 2011/027430 A1 | 3/2011 |
| WO | 2011/065388 A1 | 6/2011 |
| WO | WO 2011/118801 A1 | 9/2011 |
| WO | 2012/008422 A1 | 1/2012 |
| WO | 2012/060349 A1 | 5/2012 |

UPPER ROW: SULFIDE SOLID ELECTROLYTE MATERIAL X WITH HIGH ION CONDUCTIVITY
LOWER ROW: SULFIDE SOLID ELECTROLYTE MATERIAL Y WITH LOW ION CONDUCTIVITY

BATTERY SYSTEM, METHOD FOR PRODUCING BATTERY SYSTEM, AND BATTERY CONTROL APPARATUS

TECHNICAL FIELD

The present invention relates to a battery system in which reductive decomposition of a Ge-containing solid electrolyte material is restricted.

BACKGROUND ART

In accordance with a rapid spread of information relevant apparatuses and communication apparatuses such as a personal computer, a video camera and a portable telephone in recent years, the development of a battery to be utilized as a power source thereof has been emphasized. The development of a high-output and high-capacity battery for an electric automobile or a hybrid automobile has been advanced also in the automobile industry. A lithium battery has been presently noticed from the viewpoint of a high energy density among various kinds of batteries.

An electrolyte material having ion conductivity is ordinarily used for a battery typified by a lithium battery. Above all, a solid electrolyte material has the advantage that the simplification of a safety device is intended by reason of no fear of liquid spill as compared with a liquid electrolyte material (a liquid electrolyte). Also, a Ge-containing solid electrolyte material containing a Ge element is known as a solid electrolyte material. A material which performs comparatively high ion conductivity is known among Ge-containing solid electrolyte materials; however, a Ge-containing solid electrolyte material is so high in reduction potential as to have the property of being easily subjected to reductive decomposition (Non Patent Literature 1).

Also, for example, the problem that a solid electrolyte containing Ge may not be used in combination with an anode active material such as metal lithium (an anode active material with an electric potential of approximately 0.3 V or less on the basis of lithium) for the reason that an electric potential for causing a reduction reaction of Ge is approximately 0.3 V on the basis of lithium is described in Patent Literature 1. In order to solve this problem, a battery, in which a solid electrolyte not containing Ge is used for a second solid electrolyte contained in an anode and a fourth solid electrolyte contained in a separator contacting with the anode, is proposed in Patent Literature 1.

CITATION LIST

Patent Literature

Patent Literature 1: Japanese Patent Application Publication (JP-A) No. 2003-217663

Non Patent Literature

Non Patent Literature 1: S. Kondo et al., "New lithium ion conductors based on Li$_2$S—SiS$_2$ system", Solid State Ionics, Volumes 53-56, Part 2, July-August 1992, Pages 1183-1186

SUMMARY OF INVENTION

Technical Problem

Thus, it has been conceived that a Ge-containing solid electrolyte material is subjected to reductive decomposition so easily as to be used at an electric potential of reduction potential or less with difficulty.

The present invention has been made in view of the above-mentioned actual circumstances, and the main object thereof is to provide a battery system in which reductive decomposition of a Ge-containing solid electrolyte material is restricted.

Solution to Problem

In order to solve the problems, through earnest studies, the inventors of the present invention have completed the present invention by finding out that in the case of combining a Ge-containing solid electrolyte material with a Si-containing anode active material, battery characteristics are not deteriorated exceptionally even though a Ge-containing solid electrolyte material is used at an electric potential of reduction potential or less.

That is to say, the present invention provides a battery system comprising a battery and a control apparatus, characterized in that the battery has a cathode active material layer containing a cathode active material, an anode active material layer containing a Si-containing anode active material, and an electrolyte layer formed between the cathode active material layer and the anode active material layer, at least one of the anode active material layer and the electrolyte layer contains a Ge-containing solid electrolyte material, and the control apparatus is an apparatus to control an electric potential of the Si-containing anode active material so as to be reduction potential or less of the Ge-containing solid electrolyte material.

According to the present invention, the combination of the Ge-containing solid electrolyte material with the Si-containing anode active material allows the battery system, in which reductive decomposition of the Ge-containing solid electrolyte material is restricted, even in the case of providing the control apparatus to perform the control.

In the invention, it is preferable that the control apparatus comprises a switch part to cut off electric current of the battery, and controls the switch part so as to continue charge until an electric potential of the Si-containing anode active material becomes smaller than reduction potential of the Ge-containing solid electrolyte material in the case where charge is started when an electric potential of the Si-containing anode active material is larger than reduction potential of the Ge-containing solid electrolyte material.

In the invention, the Ge-containing solid electrolyte material preferably comprises a S element further.

In the invention, the Ge-containing solid electrolyte material preferably comprises a Li element further.

In the invention, the Ge-containing solid electrolyte material preferably comprises a P element further.

In the invention, it is preferable that the Ge-containing solid electrolyte material comprises an $M_1$ element, an $M_2$ element and a S element, in which the $M_1$ is at least one kind selected from the group consisting of Li, Na, K, Mg, Ca and Zn, and the $M_2$ is at least one kind selected from the group consisting of P, Sb, Si, Ge, Sn, B, Al, Ga, In, Ti, Zr, V and Nb, and contains at least Ge, and has a peak at a position of $2\theta=29.58°\pm0.50°$ in X-ray diffraction measurement using a CuK$\alpha$ line, and when diffraction intensity at the peak of $2\theta=29.58°\pm0.50°$ is regarded as $I_A$ and diffraction intensity at a peak of $2\theta=27.33°\pm0.50°$ is regarded as $I_B$, a value of $I_B/I_A$ is less than 0.50.

In the invention, it is preferable that the Ge-containing solid electrolyte material has an octahedron O composed of an $M_1$ element and a S element, a tetrahedron $T_1$ composed of an $M_{2a}$ element and a S element, and a tetrahedron $T_2$ composed of an $M_{2b}$ element and a S element, the tetrahedron $T_1$ and the octahedron O share an edge, the tetrahedron $T_2$ and the octahedron O contain a crystal structure sharing a corner as the main body, the $M_1$ is at least one kind selected from the group consisting of Li, Na, K, Mg, Ca and Zn, the $M_{2a}$ and the $M_{2b}$ are each independently at least one kind selected from the group consisting of P, Sb, Si, Ge, Sn, B, Al, Ga, In, Ti, Zr, V and Nb, and at least one of the $M_{2a}$ and the $M_{2b}$ contains Ge.

In the invention, the control apparatus is preferably an apparatus to control an electric potential of the Si-containing anode active material so as to be 0.25 V (vs. Li/Li$^+$) or less.

In the invention, the Si-containing anode active material is preferably Si.

In the invention, the Ge-containing solid electrolyte material contained in the electrolyte layer preferably contacts with the Si-containing anode active material contained in the anode active material layer.

Also, the present invention provides a method for producing a battery system, the battery system comprises a battery and a control apparatus, characterized in that the method for producing a battery system comprises steps of: assembling the battery, the battery has a cathode active material layer containing a cathode active material, an anode active material layer containing a Si-containing anode active material, and an electrolyte layer formed between the cathode active material layer and the anode active material layer, in which at least one of the anode active material layer and the electrolyte layer contains a Ge-containing solid electrolyte material; and installing the control apparatus to control an electric potential of the Si-containing anode active material so as to be reduction potential or less of the Ge-containing solid electrolyte material.

According to the present invention, the battery system, in which reductive decomposition of the Ge-containing solid electrolyte material is restricted, may be obtained by installing the control apparatus to perform the control in the battery combining the Ge-containing solid electrolyte material with the Si-containing anode active material.

Also, the present invention provides a battery control apparatus, characterized by controlling an electric potential of a Si-containing anode active material so as to be reduction potential or less of a Ge-containing solid electrolyte material with respect to a battery, in which the battery has a cathode active material layer containing a cathode active material, an anode active material layer containing the Si-containing anode active material, and an electrolyte layer formed between the cathode active material layer and the anode active material layer, and at least one of the anode active material layer and the electrolyte layer contains the Ge-containing solid electrolyte material.

According to the present invention, reductive decomposition of the Ge-containing solid electrolyte material may be restricted by performing the control for the battery combining the Ge-containing solid electrolyte material with the Si-containing anode active material.

Advantageous Effects of Invention

A battery system of the present invention produces the effect such as to allow reductive decomposition of a Ge-containing solid electrolyte material to be restricted.

DESCRIPTION OF EMBODIMENTS

A battery system, a method for producing a battery system, and a battery control apparatus of the present invention are hereinafter described in detail.

A. Battery System

The battery system of the present invention is a battery system comprising a battery and a control apparatus, characterized in that the battery has a cathode active material layer containing a cathode active material, an anode active material layer containing a Si-containing anode active material, and an electrolyte layer formed between the cathode active material layer and the anode active material layer, at least one of the anode active material layer and the electrolyte layer contains a Ge-containing solid electrolyte material, and the control apparatus is an apparatus to control an electric potential of the Si-containing anode active material so as to be reduction potential or less of the Ge-containing solid electrolyte material.

Figure 1:
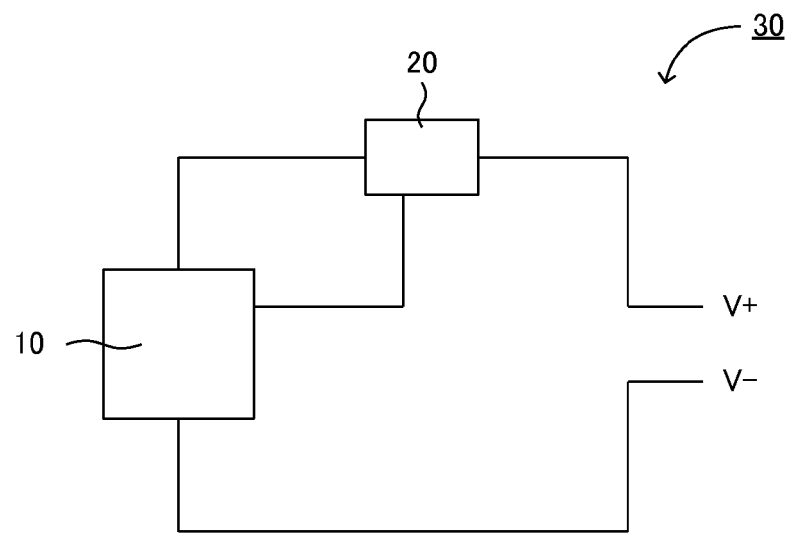
FIG. 1 is a schematic view explaining a battery system of the present invention.
Figure 2:
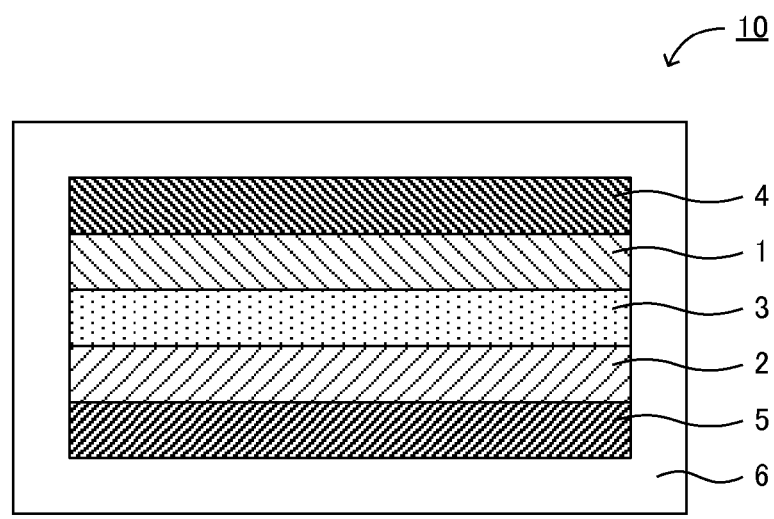
FIG. 2 is a schematic cross-sectional view showing an example of a battery in the present invention.

FIG. 1 is a schematic view explaining a battery system of the present invention, and FIG. 2 is a schematic cross-sectional view showing an example of a battery in the present invention. As shown in FIG. 1, a battery system 30 of the present invention comprises a battery 10 and a control apparatus 20. Also, as shown in FIG. 2, the battery 10 has a cathode active material layer 1 containing a cathode active material, an anode active material layer 2 containing a Si-containing anode active material, an electrolyte layer 3 formed between the cathode active material layer 1 and the anode active material layer 2, a cathode current collector 4 for collecting the cathode active material layer 1, an anode current collector 5 for collecting the anode active material layer 2, and a battery case 6 for storing these members.

Figure 3A:
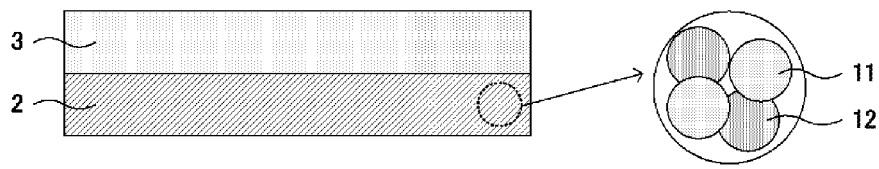
FIGS. 3A and 3B are schematic cross-sectional views each explaining a battery in the present invention.
Figure 3B:
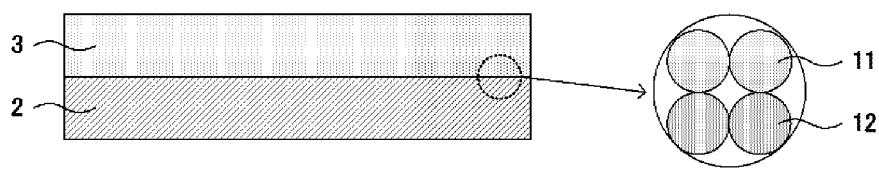

Also, with regard to the battery 10, at least one of the anode active material layer 2 and the electrolyte layer 3 contains a Ge-containing solid electrolyte material. Specifically, as shown in FIG. 3A, the anode active material layer 2 may contain a Ge-containing solid electrolyte material 11 and a Si-containing anode active material 12; as shown in FIG. 3B, the solid electrolyte layer 3 may contain the Ge-containing solid electrolyte material 11, and the anode active material layer 2 may contain the Si-containing anode active material 12. Incidentally, although not shown in the figures, the anode active material layer 2 and the electrolyte layer 3 may contain the Ge-containing solid electrolyte material 11.

On the other hand, the control apparatus 20 in FIG. 1 has a measuring part for measuring an electric potential of the Si-containing anode active material, and a switch part to cut off electric current of a battery in accordance with an electric potential of the Si-containing anode active material. Also, the control apparatus 20 is an apparatus to control an electric potential of the Si-containing anode active material so as to be reduction potential or less of the Ge-containing solid electrolyte material. The control apparatus 20 is preferably an apparatus to control the switch part so as to continue charge until an electric potential of the Si-containing anode active material becomes smaller than reduction potential of the Ge-containing solid electrolyte material in the case where charge is started when an electric potential of the Si-containing anode active material is larger than reduction potential of the Ge-containing solid electrolyte material.

According to the present invention, the combination of the Ge-containing solid electrolyte material with the Si-containing anode active material allows the battery system, in which reductive decomposition of the Ge-containing solid electrolyte material is restricted, even in the case of providing the control apparatus to perform the control. Ordinarily, an electric potential of the anode active material lowers due to charge; however, in the case where action potential (an electric potential for functioning as the active material) of the anode active material is lower than reduction potential of the Ge-containing solid electrolyte material, the problem is that reductive decomposition of the Ge-containing solid electrolyte material is caused before a charge reaction to vastly deteriorate battery characteristics such as charge-discharge properties. On the other hand, when an electric potential of the anode active material is maintained higher than reduction potential of the Ge-containing solid electrolyte material, the problem is that a charge reaction does not proceed sufficiently. Thus, ordinarily, the Ge-containing solid electrolyte material with high reduction potential has not been combined with the anode active material with low action potential.

In contrast, in the present invention, it was confirmed that the combination of the Ge-containing solid electrolyte material with the Si-containing anode active material allows reductive decomposition of the Ge-containing solid electrolyte material to be restricted unexpectedly. Thus, the potential of the Si-containing anode active material may be sufficiently brought out while restricting reductive decomposition of the Ge-containing solid electrolyte material. The Si-containing anode active material has the property such that action potential during charge (during metal ion occlusion) is low, and very large capacity as compared with a general carbon anode active material. In the present invention, the use of the Si-containing anode active material allows a high-capacity battery system. Also, some of the Ge-containing solid electrolyte materials exhibit high Li ion conductance ($10^{-3}$ S/cm or higher at the temperature of 25° C.). In the present invention, the use of such a Ge-containing solid electrolyte material allows a high-output battery system.

Also, a mechanism for allowing reductive decomposition of the Ge-containing solid electrolyte material to be restricted is not necessarily clear; however, reductive decomposition is electrolysis, so that it is guessed that the supply of an electron to the Ge-containing solid electrolyte material at reduction potential is the cause of reductive decomposition of the Ge-containing solid electrolyte material. In the present invention, the use of the Si-containing anode active material with low electron conductivity possibly allows reductive decomposition of the Ge-containing solid electrolyte material to be restricted. Also, another assumed mechanism is conceived to be possibly such that a reductive decomposition product of the Ge-containing solid electrolyte material reacts with the Si-containing anode active material to form a film for restricting reductive decomposition of the Ge-containing solid electrolyte material at an interface therebetween. Incidentally, in the FIGS. 3A and 3B, the Ge-containing solid electrolyte material 11 contacts with the Si-containing anode active material 12; the contact in the present invention is a concept including both the case where the two contact directly and the case where the two contact through the film. The presence of the film may be possibly confirmed by a transmission electron microscope (TEM) and a field emission scanning electron microscope, for example.

The battery system of the present invention is hereinafter described in each constitution.

1. Battery

The battery in the present invention has at least a cathode active material layer, an anode active material layer and an electrolyte layer. First, the anode active material layer in the present invention is described.

(1) Anode Active Material Layer

The anode active material layer in the present invention is a layer containing at least a Si-containing anode active material, and may contain at least one of a solid electrolyte material, a conductive material and a binder, as required. In particular, in the present invention, the anode active material layer preferably contains a solid electrolyte material. The reason therefor is to allow the anode active material layer with high ion conductivity. In addition, in the present invention, the anode active material layer preferably contains a Ge-containing solid electrolyte material.

(i) Si-Containing Anode Active Material

The Si-containing anode active material in the present invention is not particularly limited if the material is an active material containing at least a Si element. Examples of the Si-containing anode active material include Si, a Si alloy, Si oxide, Si nitride and Si sulfide. Examples of the Si alloy include a Si—Al alloy, a Si—Sn alloy, a Si—In alloy, a Si—Ag alloy, a Si—Pb alloy, a Si—Sb alloy, a Si—Bi alloy, a Si—Mg alloy, a Si—Ca alloy, a Si—Ge alloy, and a Si—Pb alloy. Incidentally, for example, the Si—Al alloy signifies an alloy containing at least Si and Al, and may be an alloy composed of only Si and Al, or an alloy further containing other elements. The alloys exemplified except for the Si—Al alloy are the same. The Si alloy may be a binary alloy or a multicomponent alloy such as ternary or more. Also, examples of the Si oxide include SiO. Also, the Si-containing anode active material may be filmy or powdery.

The content of the Si-containing anode active material in the anode active material layer is not particularly limited but is, for example, preferably 50% by weight or more, more preferably 60% by weight to 99% by weight, and far more preferably 70% by weight to 95% by weight.

(ii) Ge-Containing Solid Electrolyte Material

The Ge-containing solid electrolyte material in the present invention is not particularly limited if the material is a solid electrolyte material containing at least a Ge element. Above all, it is preferable that the Ge-containing solid electrolyte material further contains a S element, that is, is a sulfide solid electrolyte material. The reason therefor is that ion conductivity is high. Also, it is preferable that the Ge-containing solid electrolyte material further contains a Li element, that is, is a Li ion conductivite solid electrolyte material. The reason therefor is to allow a useful lithium battery. Also, it is preferable that the Ge-containing solid electrolyte material further contains a P element. The reason therefor is to allow chemical stability to be improved.

The Ge-containing solid electrolyte material may be an amorphous body (glass), a crystalline body or glass ceramics obtained by heat-treating glass. Also, the Ge-containing solid electrolyte material may be an oxide solid electrolyte material or a sulfide solid electrolyte material. Examples of the oxide solid electrolyte material having Li ion conductivity include a solid electrolyte material having a NASICON type structure, and specific examples thereof include an Li—Al—Ge—P—O-based solid electrolyte material. In particular, in the present invention, the oxide solid electrolyte material having Li ion conductivity is preferably a solid electrolyte material (LAGP) represented by a general formula $Li_{1+x}Al_xGe_{2-x}(PO_4)_3$ ($0 \leq x \leq 2$).

Also, examples of the sulfide solid electrolyte material having Li ion conductivity include an Li—Ge—S-based solid electrolyte material. The Li—Ge—S-based solid electrolyte material may be composed of only Li, Ge and S, or further contain other elements of one kind or two kinds or more. Examples of other elements include P, Sb, Si, Sn, B, Al, Ga, In, Ti, Zr, V and Nb; among them, P is preferable. Also, the sulfide solid electrolyte material may be the so-called thio-LISICON type solid electrolyte material. In addition, the sulfide solid electrolyte material (particularly, glassy sulfide solid electrolyte material) may contain a halide such as LiI or an orthooxo acid lithium salt such as $Li_3PO_4$.

In particular, in the present invention, it is preferable that the Ge-containing solid electrolyte material contains an $M_1$ element, an $M_2$ element and a S element, in which the $M_1$ is at least one kind selected from the group consisting of Li, Na, K, Mg, Ca and Zn, and the $M_2$ is at least one kind selected from the group consisting of P, Sb, Si, Ge, Sn, B, Al, Ga, In, Ti, Zr, V and Nb, and contains at least Ge, and has a peak at a position of $2\theta=29.58°\pm0.50°$ in X-ray diffraction measurement using a CuKα line, and when diffraction intensity at the peak of $2\theta=29.58°\pm0.50°$ is regarded as $I_A$ and diffraction intensity at a peak of $2\theta=27.33°\pm0.50°$ is regarded as $I_B$, a value of $I_B/I_A$ is less than 0.50. The reason therefor is that ion conductivity is high. This Ge-containing solid electrolyte material is hereinafter regarded as a sulfide solid electrolyte material X.

Figure 4:
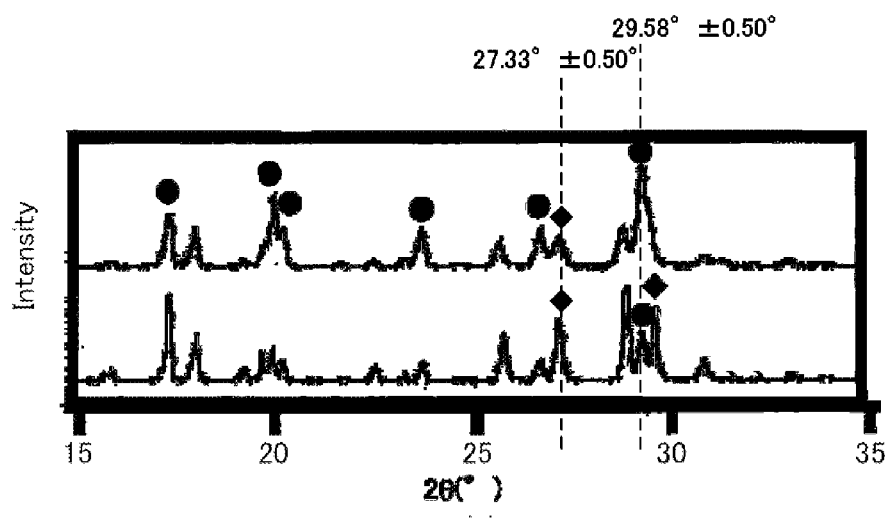
FIG. 4 is an X-ray diffraction pattern explaining a Ge-containing solid electrolyte material in the present invention.

FIG. 4 is an X-ray diffraction pattern explaining a difference between a sulfide solid electrolyte material X with high ion conductivity and a sulfide solid electrolyte material Y with low ion conductivity. Incidentally, both of the two sulfide solid electrolyte materials in FIG. 4 have a composition of $Li_{3.25}Ge_{0.25}P_{0.75}S_4$. The sulfide solid electrolyte material X has a peak at a position of $2\theta=29.58°\pm0.50°$ and a position of $2\theta=27.33°\pm0.50°$. The sulfide solid electrolyte material Y also has the same peak. Here, it is conceived that a crystal phase having a peak in the vicinity of $2\theta=29.58°$ and a crystal phase having a peak in the vicinity of $2\theta=27.33°$ are crystal phases different from each other. Incidentally, in the present invention, the crystal phase having a peak in the vicinity of $2\theta=29.58°$ and the crystal phase having a peak in the vicinity of $2\theta=27.33°$ are occasionally referred to as "crystal phase A" and "crystal phase B", respectively.

Both of the crystal phases A and B are crystal phases exhibiting ion conductivity, which is different. The crystal phase A is conceived to be remarkably high in ion conductivity as compared with the crystal phase B. A conventional synthesis method (such as a solid-phase method) has not been capable of decreasing the ratio of the crystal phase B with low ion conductivity, and has not been capable of sufficiently heightening ion conductivity. In contrast, in the present invention, the crystal phase A with high ion conductivity may be precipitated so positively by the method described in the after-mentioned Production Example 1 as to allow the sulfide solid electrolyte material X with high ion conductivity.

Also, in the present invention, in order to distinguish between the sulfide solid electrolyte material X and the sulfide solid electrolyte material Y, diffraction intensity at a peak in the vicinity of $2\theta=29.58°$ is regarded as $I_A$ and diffraction intensity at a peak in the vicinity of $2\theta=27.33°$ is regarded as $I_B$, and a value of $I_B/I_A$ is prescribed at less than 0.50. Incidentally, it is conceived that a conventional synthesis method has not allowed the sulfide solid electrolyte material X such that a value of $I_B/I_A$ is less than 0.50. Also, from the viewpoint of ion conductivity, the ratio of the crystal phase A with high ion conductivity is preferably high. Thus, a value of $I_B/I_A$ is preferably smaller; specifically, preferably 0.45 or less, more preferably 0.25 or less, far more preferably 0.15 or less, and particularly preferably 0.07 or less. Also, a value of $I_B/I_A$ is preferably 0. In other words, it is preferable that the sulfide solid electrolyte material X does not have a peak in the vicinity of $2\theta=27.33°$ as a peak of the crystal phase B.

The sulfide solid electrolyte material X has a peak in the vicinity of $2\theta=29.58°$. This peak is one of the peaks of the crystal phase A with high ion conductivity, as described above. Here, $2\theta=29.58°$ is an actual measurement value obtained in the after-mentioned Production Example 1, and a crystal lattice changes somewhat due to factors such as material composition, so that a position of the peak occasionally shifts somewhat from $2\theta=29.58°$. Thus, in the present invention, the peak of the crystal phase A is defined as a peak at a position of $2\theta=29.58°\pm0.50°$. The crystal phase A is ordinarily conceived to have peaks of $2\theta=17.38°$, $20.18°$, $20.44°$, $23.56°$, $23.96°$, $24.93°$, $26.96°$, $29.07°$, $29.58°$, $31.71°$, $32.66°$ and $33.39°$. Incidentally, also these peak positions occasionally shift in a range of $\pm0.50°$.

On the other hand, the peak in the vicinity of $2\theta=27.33°$ is one of the peaks of the crystal phase B with low ion conductivity, as described above. Here, $2\theta=27.33°$ is an actual measurement value obtained in the after-mentioned Production Example 2, and a crystal lattice changes somewhat due to factors such as material composition, so that a position of the peak occasionally shifts somewhat from $2\theta=27.33°$. Thus, in the present invention, the peak of the crystal phase B is defined as a peak at a position of $2\theta=27.33°\pm0.50°$. The crystal phase B is ordinarily conceived to have peaks of $2\theta=17.46°$, $18.12°$, $19.99°$, $22.73°$, $25.72°$, $27.33°$, $29.16°$ and $29.78°$. Incidentally, also these peak positions occasionally shift in a range of $\pm0.50°$.

Also, the sulfide solid electrolyte material X contains an $M_1$ element, an $M_2$ element and a S element. The $M_1$ is preferably a monovalent or divalent element. Examples of the $M_1$ include at least one kind selected from the group consisting of Li, Na, K, Mg, Ca and Zn. Above all, the $M_1$ preferably contains at least Li. Also, the $M_1$ may be only Li or a combination of Li and another element. Also, the $M_1$ may be a monovalent element (such as Li, Na and K), which is partially substituted with a divalent or more element (such as Mg, Ca and Zn). Thus, a monovalent element moves so easily as to improve ion conductivity.

On the other hand, the $M_2$ contains at least Ge. Also, the $M_2$ is preferably a trivalent, tetravalent or pentavalent element. Examples of the $M_2$ include one kind selected from the group consisting of P, Sb, Si, Ge, Sn, B, Al, Ga, In, Ti, Zr, V and Nb. Above all, in the present invention, the $M_2$ preferably contains at least P and Ge.

Also, the sulfide solid electrolyte material X preferably contains a Li element, a Ge element, a P element and a S element. In addition, the composition of the LiGePS-based sulfide solid electrolyte material is preferably a composition of $Li_{(4-x)}Ge_{(1-x)}P_xS_4$ (x satisfies 0<x<1). The reason therefor is to allow the sulfide solid electrolyte material with high ion conductivity. Here, a composition of $Li_{(4-x)}Ge_{(1-x)}P_xS_4$ corresponds to a composition of a solid solution of $Li_3PS_4$ and $Li_4GeS_4$. That is to say, this composition corresponds to a composition on a tie line of $Li_3PS_4$ and $Li_4GeS_4$. Incidentally, both $Li_3PS_4$ and $Li_4GeS_4$ correspond to an ortho-composition and have the advantage that chemical stability is high.

Also, "x" in $Li_{(4-x)}Ge_{(1-x)}P_xS_4$ is not particularly limited if the "x" is a value such as to allow a predetermined value of $I_B/I_A$, but satisfies preferably 0.4≤x, more preferably 0.5≤x, and far more preferably 0.6≤x, for example. On the other hand, the "x" satisfies preferably x≤0.8, and more preferably x≤0.75. The reason therefor is that such a range of "x" allows a value of $I_B/I_A$ to be further decreased.

Also, in the present invention, it is preferable that the Ge-containing solid electrolyte material has an octahedron O composed of an $M_1$ element and a S element, a tetrahedron $T_1$ composed of an $M_{2a}$ element and a S element, and a tetrahedron $T_2$ composed of an $M_{2b}$ element and a S element, the tetrahedron $T_1$ and the octahedron O share an edge, the tetrahedron $T_2$ and the octahedron O contain a crystal structure sharing a corner as the main body, the $M_1$ is at least one kind selected from the group consisting of Li, Na, K, Mg, Ca and Zn, the $M_{2a}$ and the $M_{2b}$ are each independently at least one kind selected from the group consisting of P, Sb, Si, Ge, Sn, B, Al, Ga, In, Ti, Zr, V and Nb, and at least one of the $M_{2a}$ and the $M_{2b}$ contains Ge. This Ge-containing solid electrolyte material is hereinafter regarded as a sulfide solid electrolyte material Z.

Figure 5:
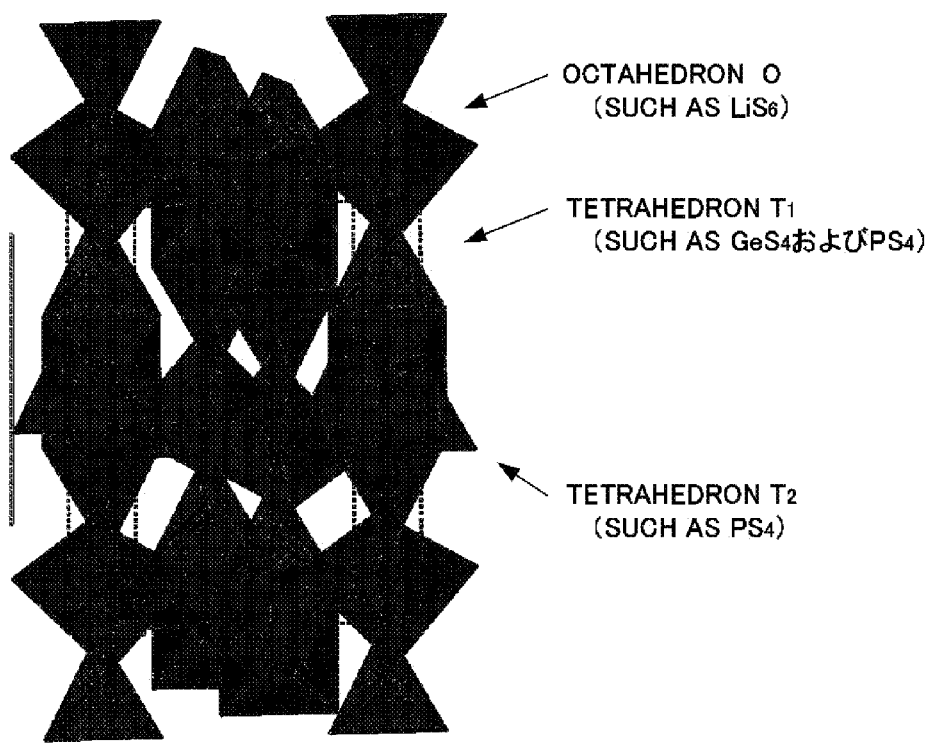
FIG. 5 is a perspective view explaining an example of a crystal structure of a Ge-containing solid electrolyte material in the present invention.

FIG. 5 is a perspective view explaining an example of a crystal structure of the sulfide solid electrolyte material Z. In the crystal structure shown in FIG. 5, the octahedron O has $M_1$ as the central element, and has six S elements at the corner of the octahedron; typically, $LiS_6$ octahedron. The tetrahedron $T_1$ has $M_{2a}$ as the central element, and has four S elements at the corner of the tetrahedron; typically, both $GeS_4$ tetrahedron and $PS_4$ tetrahedron. The tetrahedron $T_2$ has $M_{2b}$ as the central element, and has four S elements at the corner of the tetrahedron; typically, $PS_4$ tetrahedron. In addition, the tetrahedron $T_1$ and the octahedron O share an edge, and the tetrahedron $T_2$ and the octahedron O share a corner.

The sulfide solid electrolyte material Z is greatly characterized by including the crystal structure as the main body. The ratio of the crystal structure in the whole crystal structure of the sulfide solid electrolyte material is not particularly limited but is preferably higher. The reason therefor is to allow the sulfide solid electrolyte material with high ion conductivity. The ratio of the crystal structure is, specifically, preferably 70% by weight or more, and more preferably 90% by weight or more. Incidentally, the ratio of the crystal structure may be measured by radiated light XRD, for example. In particular, the sulfide solid electrolyte material Z is preferably a single-phase material of the crystal structure. The reason therefor is to allow ion conductivity to be extremely heightened.

Incidentally, the $M_1$ element, the $M_2$ element ($M_{2a}$ element and $M_{2b}$ element), and other items in the sulfide solid electrolyte material Z are the same as the contents described in the above-mentioned sulfide solid electrolyte material X; therefore, the description here is omitted.

The shape of the Ge-containing solid electrolyte material in the present invention is not particularly limited but examples thereof include a powdery shape. In addition, the average particle diameter of the powdery Ge-containing solid electrolyte material is, for example, preferably within a range of 0.1 μm to 50 μm. Also, the content of the Ge-containing solid electrolyte material in the anode active material layer is not particularly limited but is, for example, preferably within a range of 0.1% by weight to 80% by weight, more preferably within a range of 1% by weight to 60% by weight, and far more preferably within a range of 10% by weight to 50% by weight.

(iii) Anode Active Material Layer

The anode active material layer in the present invention may further contain a conductive material. The addition of the conductive material allows conductivity of the anode active material layer to be improved. Examples of the conductive material include acetylene black, Ketjen Black and carbon fiber. Also, the anode active material layer may contain a binder. Examples of kinds of the binder include a fluorine-containing binder such as polytetrafluoroethylene (PTFE). Also, the thickness of the anode active material layer is preferably within a range of 0.1 μm to 1000 μm, for example.

(2) Electrolyte Layer

The electrolyte layer in the present invention is a layer formed between the cathode active material layer and the anode active material layer. The electrolyte layer is not particularly limited if the layer is a layer such as to allow ion conduction, but is preferably a solid electrolyte layer composed of a solid electrolyte material. The reason therefor is to allow the battery with high safety as compared with a battery using a liquid electrolyte. In addition, in the present invention, a solid electrolyte layer preferably contains the above-mentioned Ge-containing solid electrolyte material. The ratio of the Ge-containing solid electrolyte material contained in a solid electrolyte layer is, for example, preferably within a range of 10% by weight to 100% by weight, and more preferably within a range of 50% by weight to 100% by weight. In the present invention, a solid electrolyte layer may be composed of only the Ge-containing solid electrolyte material. Also, in the present invention, the Ge-containing solid electrolyte material contained in the solid electrolyte layer preferably contacts with the Si-containing anode active material contained in the anode active material layer. The thickness of a solid electrolyte layer is preferably within a range of 0.1 μm to 1000 μm, for example, and within a range of 0.1 μm to 300 μm, above all.

Also, the electrolyte layer in the present invention may be a layer composed of a liquid electrolyte. The case of using a liquid electrolyte allows the higher-output battery though safety needs to be further considered as compared with the case of using a solid electrolyte layer. Also, in this case, ordinarily, the anode active material layer contains the Ge-containing solid electrolyte material. A liquid electrolyte to be used for a lithium battery ordinarily contains a lithium salt and an organic solvent (a nonaqueous solvent). Examples of the lithium salt include inorganic lithium salts such as $LiPF_6$, $LiBF_4$, $LiClO_4$ and $LiAsF_6$, and organic lithium salts such as $LiCF_3SO_3$, $LiN(CF_3SO_2)_2$, $LiN(C_2F_5SO_2)_2$ and $LiC(CF_3SO_2)_3$. Examples of the organic solvent include ethylene carbonate (EC), propylene carbonate (PC), dimethyl carbonate (DMC), diethyl carbonate (DEC), ethylmethyl carbonate (EMC) and butylene carbonate (BC).

(3) Cathode Active Material Layer

The cathode active material layer in the present invention is a layer containing at least a cathode active material, and may contain at least one of a solid electrolyte material, a conductive material and a binder, as required. In particular, in the present invention, the cathode active material layer preferably contains a solid electrolyte material. The reason therefor is to allow the cathode active material layer with high ion conductivity. In addition, in the present invention, the cathode active material layer preferably contains the above-mentioned Ge-containing solid electrolyte material. Also, a cathode active material is not particularly limited but examples thereof include $LiCoO_2$, $LiMnO_2$, $Li_2NiMn_3O_8$, $LiVO_2$, $LiCrO_2$, $LiFePO_4$, $LiCoPO_4$, $LiNiO_2$ and $LiNi_{1/3}Co_{1/3}Mn_{1/3}O_2$. Incidentally, a conductive material and a binder used for the cathode active material layer are the same as the case of the anode active material layer. Also, the thickness of the cathode active material layer is preferably within a range of 0.1 μm to 1000 μm, for example.

(4) Other Constitutions

The battery of the present invention has at least the anode active material layer, the electrolyte layer and the cathode active material layer, ordinarily further having a cathode current collector for collecting the cathode active material layer and an anode current collector for collecting the anode active material layer. Examples of a material for the cathode current collector include SUS, aluminum, nickel, iron, titanium and carbon. On the other hand, examples of a material for the anode current collector include SUS, copper, nickel and carbon. Factors such as the thickness and shape of the cathode current collector and the anode current collector are preferably selected properly in accordance with uses of a battery. Also, a battery case of a general battery may be used for a battery case. Examples of the battery case include a battery case made of SUS.

(5) Battery

The battery of the present invention may be a primary battery or a secondary battery, preferably a secondary battery among them. The reason therefor is to be repeatedly charged and discharged and be useful as a car-mounted battery, for example. Examples of the shape of the battery include a coin shape, a laminate shape, a cylindrical shape and a rectangular shape.

2. Control Apparatus

The control apparatus in the present invention is an apparatus to control an electric potential of the Si-containing anode active material so as to be reduction potential or less of the Ge-containing solid electrolyte material. The control apparatus has, for example, a measuring part for measuring an electric potential of the Si-containing anode active material, and a switch part to cut off electric current of a battery in accordance with an electric potential of the Si-containing anode active material.

The reduction potential of the Ge-containing solid electrolyte material may be generally measured by cyclic voltammetry. On the other hand, in the case where the Ge-containing solid electrolyte material is a sulfide solid electrolyte material containing Li, the reduction potential of the Ge-containing solid electrolyte material may be measured in detail by the following (a) and (b). Incidentally, even though the Ge-containing solid electrolyte material is a solid electrolyte material not containing Li, the reduction potential of the Ge-containing solid electrolyte material may be measured by the same method.

(a) Production of Reduction Potential Evaluation Battery

First, 0.382771 g of $Li_2S$ and 0.617229 g of $P_2S_5$ are mixed in an agate mortar, put in a $ZrO_2$ pot (45 cc) together with $ZrO_2$ balls (ϕ 10 mm×10 pieces), and treated in a ball mill apparatus manufactured by Fritsch Japan Co., Ltd. on the conditions of the number of revolutions of 370 rpm and 40 hours to obtain a sulfide solid electrolyte material ($75Li_2S\cdot25P_2S_5$). Next, the obtained sulfide solid electrolyte material is taken by 100 mg, put in a ϕ-11.3 mm cylinder made of macole, and pressed at 1 ton/cm² to form a solid electrolyte layer. Next, the sulfide solid electrolyte material (the Ge-containing solid electrolyte material) as a measuring object and stainless steel particles are mixed so as to be 1:1 at volume ratio, and the powder thereof is taken by 15 mg, put on one surface of the solid electrolyte layer, and pressed at 4 ton/cm². In addition, In foils stamped into ϕ 10 mm of four pieces and Li foil stamped into ϕ 6 mm of one piece are disposed on the other surface of the solid electrolyte layer, and pressed at 1 ton/cm² to obtain a power generating element. Stainless steel (current collector) is disposed on both surfaces of the obtained power generating element, and constrained by screw fastening at a torque of 6 Ncm. In this state, the powder stands for ten hours for promoting the alloying of Li and In to obtain a reduction potential evaluation battery. Incidentally, all of the processes are performed under an Ar atmosphere.

(b) Measurement of Reduction Potential

The obtained reduction potential evaluation battery is used, and constant-current charge is performed at a current density of 0.1 mA/cm² up to −0.62 V while using LiIn alloy as a reference electrode and a layer containing the measuring object as a working electrode. Thus, a charging curve, in which a horizontal axis is used as capacity and a vertical axis is used as an electric potential (vs. LiIn) of the working electrode, is obtained. 0.62 V is added to an electric potential of the obtained charging curve to change potential standard from LiIn to Li/Li+. In the changed charging curve, the electric potential is differentiated with the capacity to make a graph, in which a horizontal axis is used as the electric potential and a vertical axis is used as dV/dQ. An intersection point of a linear portion A such that a value of dV/dQ is within a range of −0.01 to 0.01 and a linear portion B having an inclination is conceived to be reduction potential, and in order to define uniquely, the maximum electric potential in the linear portion A such as to allow dV/dQ=0 is defined as reduction potential.

Also, in the present invention, an electric potential of the Si-containing anode active material is controlled so as to be reduction potential or less of the Ge-containing solid electrolyte material. Above all, an electric potential of the Si-containing anode active material is preferably controlled so as to be action potential or less during metal ion occlusion. The action potential of the Si-containing anode active material may be measured from an electric potential of a plateau portion of a curve obtained by producing an evaluation battery as described in the after-mentioned examples to perform a charge and discharge test, for example. On the other hand, the action potential of the Si-containing anode active material may be measured in detail by the following (c) and (d). Incidentally, the action potential of the Si-containing anode active material in the case of using a metal ion except an Li ion may be also measured by the same method.

(c) Production of Action Potential Evaluation Battery

First, 0.382771 g of $Li_2S$ and 0.617229 g of $P_2S_5$ are mixed in an agate mortar, put in a $ZrO_2$ pot (45 cc) together with $ZrO_2$ balls (φ 10 mm×10 pieces), and treated in a ball mill apparatus manufactured by Fritsch Japan Co., Ltd. on the conditions of the number of revolutions of 370 rpm and 40 hours to obtain a sulfide solid electrolyte material ($75Li_2S·25P_2S_5$). Next, the obtained sulfide solid electrolyte material is taken by 100 mg, put in a φ-11.3 mm cylinder made of macole, and pressed at 1 ton/$cm^2$ to form a solid electrolyte layer. Next, the obtained sulfide solid electrolyte material and the Si-containing anode active material are mixed so as to be 1:1 at volume ratio, and the powder thereof is taken by 15 mg, put on one surface of the solid electrolyte layer, and pressed at 4 ton/$cm^2$. In addition, In foils stamped into φ 10 mm of four pieces and Li foil stamped into φ 6 mm of one piece are disposed on the other surface of the solid electrolyte layer, and pressed at 1 ton/$cm^2$ to obtain a power generating element. Stainless steel (current collector) is disposed on both surfaces of the obtained power generating element, and constrained by screw fastening at a torque of 6 Ncm. In this state, the powder stands for ten hours for promoting the alloying of Li and In to obtain an action potential evaluation battery. Incidentally, all of the processes are performed under an Ar atmosphere.

(d) Measurement of Action Potential

The obtained action potential evaluation battery is used, and constant-current charge is performed at a current density of 0.1 mA/$cm^2$ up to −0.62 V while using LiIn alloy as a reference electrode and a layer containing the Si-containing anode active material as a working electrode. Thus, a charging curve, in which a horizontal axis is used as capacity and a vertical axis is used as an electric potential (vs. LiIn) of the working electrode, is obtained. Added to an electric potential of the obtained charging curve is 0.62 V to change potential standard from LiIn to Li/Li+. In the changed charging curve, the electric potential is differentiated with the capacity to make a graph, in which a horizontal axis is used as the electric potential and a vertical axis is used as dV/dQ. An intersection point of a linear portion A such that a value of dV/dQ is within a range of −0.01 to 0.01 and a linear portion B having an inclination is conceived to be action potential, and in order to define uniquely, the maximum electric potential in the linear portion A such as to allow dV/dQ=0 is defined as action potential.

In the present invention, for example, an electric potential of the Si-containing anode active material is preferably controlled so as to be 0.25 V (vs. Li/$Li^+$) or less, an electric potential of the Si-containing anode active material is controlled more preferably so as to be 0.15 V (vs. Li/$Li^+$) or less, and an electric potential of the Si-containing anode active material is controlled far more preferably so as to be 0.05 V (vs. Li/$Li^+$) or less.

B. Method for Producing Battery System

Next, a method for producing a battery system of the present invention is described. The method for producing a battery system of the present invention, the battery system comprising a battery and a control apparatus, characterized in that the method for producing a battery system comprises steps of: assembling the battery, the battery has a cathode active material layer containing a cathode active material, an anode active material layer containing a Si-containing anode active material, and an electrolyte layer formed between the cathode active material layer and the anode active material layer, in which at least one of the anode active material layer and the electrolyte layer contains a Ge-containing solid electrolyte material; and installing the control apparatus to control an electric potential of the Si-containing anode active material so as to be reduction potential or less of the Ge-containing solid electrolyte material.

Figure 6A:
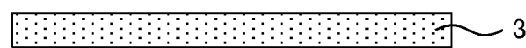
FIGS. 6A to 6D are schematic cross-sectional views showing an example of a battery assembly step in a method for producing a battery system of the present invention.
Figure 6B:
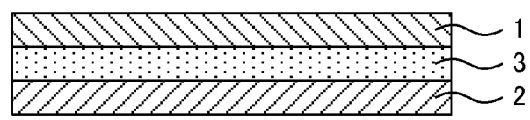
Figure 6C:
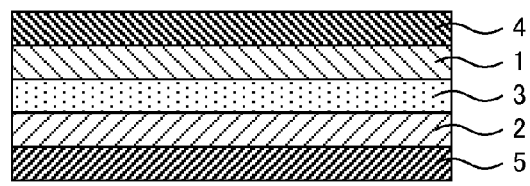
Figure 6D:
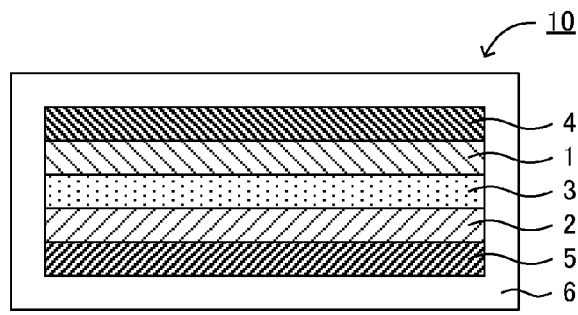

FIGS. 6A to 6D are schematic cross-sectional views showing an example of the battery assembly step. Specifically, FIGS. 6A to 6D are schematic cross-sectional views showing an example of a method for producing a solid state battery provided with a solid electrolyte layer. In FIGS. 6A to 6D, first, a solid electrolyte material is pressed to thereby form a solid electrolyte layer 3 (FIG. 6A). Next, a cathode mixture is added and pressed to one surface of the solid electrolyte layer 3 to thereby form a cathode active material layer 1, and thereafter an anode mixture is added and pressed to the other surface of the solid electrolyte layer 3 to thereby form an anode active material layer 2 (FIG. 6B). Next, a cathode current collector 4 is disposed on the surface of the cathode active material layer 1, and an anode current collector 5 is disposed on the surface of the anode active material layer 2 (FIG. 6C). Finally, this member is stored and sealed inside a battery case 6 to thereby obtain a battery 10 (FIG. 6D). As not shown in the figures, a battery system is obtained by installing the control apparatus to control an electric potential of the Si-containing anode active material so as to be reduction potential or less of the Ge-containing solid electrolyte material in this obtained battery 10.

According to the present invention, the battery system, in which reductive decomposition of the Ge-containing solid electrolyte material is restricted, may be obtained by installing the control apparatus to perform the control in the battery combining the Ge-containing solid electrolyte material with the Si-containing anode active material.

The producing method for a battery system of the present invention is hereinafter described for each step.

1. Battery Assembly Step

A battery assembly step in the present invention is a step of assembling the battery. The assembly method for the battery is not particularly limited but is the same as a general method. Also, the battery assembly step shown in FIGS. 6A to 6D is merely an example and the order and other factors may be optionally modified.

2. Control Apparatus Installation Step

A control apparatus installation step in the present invention is a step of installing the control apparatus. The timing for installing the control apparatus is not particularly limited if a desired battery system may be produced. For example, the control apparatus may be installed after the battery assembly step or during the battery assembly step.

C. Battery Control Apparatus

Next, a battery control apparatus of the present invention is described. The battery control apparatus of the present invention is characterized by controlling an electric potential of a Si-containing anode active material so as to be reduction potential or less of a Ge-containing solid electrolyte material with respect to the battery, in which the battery has a cathode active material layer containing a cathode active material, an anode active material layer containing the Si-containing anode active material, and an electrolyte layer formed between the cathode active material layer and the anode active material layer, in which at least one of the anode active material layer and the electrolyte layer contains the Ge-containing solid electrolyte material.

According to the present invention, reductive decomposition of the Ge-containing solid electrolyte material may be restricted by performing the control for the battery combining the Ge-containing solid electrolyte material with the Si-containing anode active material. The battery control apparatus of the present invention is the same as the contents described in the "A. Battery system"; therefore, the description here is omitted.

Incidentally, the present invention is not limited to the embodiments. The embodiments are exemplification, and any is included in the technical scope of the present invention if it has substantially the same constitution as the technical idea described in the claim of the present invention and offers similar operation and effect thereto.

EXAMPLES

The present invention is described more specifically while showing examples hereinafter.

Production Example 1

Synthesis of Ge-Containing Solid Electrolyte Material

Lithium sulfide ($Li_2S$), diphosphorus pentasulfide ($P_2S_5$) and germanium sulfide ($GeS_2$) were used as a starting material. These powders were mixed in a glove box under an argon atmosphere at a ratio of 0.39019 g of $Li_2S$, 0.377515 g of $P_2S_5$ and 0.232295 g of $GeS_2$ to obtain a raw material composition. Next, 1 g of the raw material composition was put in a pot made of zirconia (45 ml) together with zirconia ball (10 mm φ, 10 pieces) to hermetically seal the pot completely (an argon atmosphere). This pot was mounted on a planetary ball milling machine (P7™ manufactured by Fritsch Japan Co., Ltd.) to perform mechanical milling for 40 hours at the number of weighing table revolutions of 370 rpm. Thus, an amorphized ion conductivity material having a composition of $Li_{3.33}Ge_{0.33}P_{0.67}S_4$ was obtained.

Next, the obtained ion conductivity material was put in a carbon-coated quartz tube and vacuum-sealed. The pressure of the quartz tube for vacuum-sealing was approximately 30 Pa. Next, the quartz tube was placed in a burning furnace, heated from room temperature to 550° C. over 6 hours, maintained at 550° C. for 8 hours, and thereafter slowly cooled down to room temperature. Thus, a crystalline Ge-containing solid electrolyte material (electrolytic powder) having a composition of $Li_{3.33}Ge_{0.33}P_{0.67}S_4$ was obtained. Incidentally, the composition corresponds to a composition of x=0.67 in $Li_{(4-x)}Ge_{(1-x)}P_xS_4$.

Figure 7:
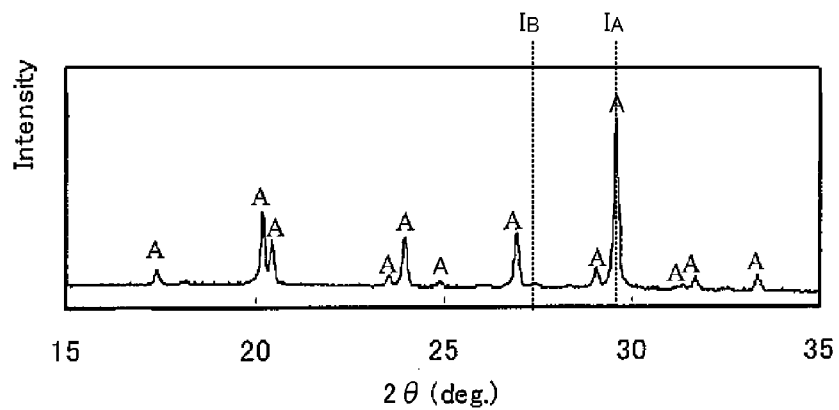
FIG. 7 is an X-ray diffraction pattern of a Ge-containing solid electrolyte material obtained in Production Example 1.

X-ray diffraction (XRD) measurement was performed while using the obtained Ge-containing solid electrolyte material. XRD measurement was performed for a powder sample under an inert atmosphere on the conditions of using a CuKα line. The result is shown in FIG. 7. As shown in FIG. 7, the single-phase Ge-containing solid electrolyte material was obtained. The position of a peak was 2θ=17.38°, 20.18°, 20.44°, 23.56°, 23.96°, 24.93°, 26.96°, 29.07°, 29.58°, 31.71°, 32.66° and 33.39°. That is to say, these peaks are conceived to be the peaks of the crystal phase A with high ion conductivity. Incidentally, the peak of 2θ=27.33°±0.50° as the peak of the crystal phase B with low ion conductivity was not confirmed.

Also, the crystal structure of the obtained Ge-containing solid electrolyte material was identified by X-ray structural analysis. The crystal system and crystallographic group were determined by a direct method on the basis of a diffraction pattern obtained in XRD to thereafter identify the crystal structure by a real space method. As a result, it was confirmed that the Ge-containing solid electrolyte material had the crystal structure as shown in FIG. 5. That is to say, the crystal structure was such that the tetrahedron $T_1$ ($GeS_4$ tetrahedron and $PS_4$ tetrahedron) and the octahedron O ($LiS_6$ octahedron) shared an edge, and the tetrahedron $T_2$ ($PS_4$ tetrahedron) and the octahedron O ($LiS_6$ octahedron) shared a corner. This crystal structure is conceived to contribute to high Li conduction.

Production Example 2

Synthesis of Ge-Containing Solid Electrolyte Material

Lithium sulfide ($Li_2S$), diphosphorus pentasulfide ($P_2S_5$) and germanium sulfide ($GeS_2$) were used as a starting material. These powders were mixed in a glove box under an argon atmosphere at a ratio of 0.3878 g of $Li_2S$, 0.4818 g of $P_2S_5$ and 0.1304 g of $GeS_2$ to obtain a raw material composition. Next, 1 g of the raw material composition was mixed in an agate mortar. Next, the obtained mixture was put in a carbon-coated quartz tube and vacuum-sealed. The pressure of the quartz tube for vacuum-sealing was approximately 30 Pa. Next, the quartz tube was placed in a burning furnace, heated from room temperature to 700° C. over 6 hours, maintained at 700° C. for 8 hours, and thereafter slowly cooled down to room temperature. Thus, a crystalline Ge-containing solid electrolyte material (electrolytic powder) having a composition of $Li_{3.25}Ge_{0.25}P_{0.75}S_4$ was obtained. Incidentally, the composition corresponds to a composition of x=0.75 in $Li_{(4-x)}Ge_{(1-x)}P_xS_4$.

X-ray diffraction (XRD) measurement was performed while using the obtained Ge-containing solid electrolyte material. As a result, both the peak of the crystal phase A with high ion conductivity and the peak of the crystal phase B with low ion conductivity were confirmed. The value of $I_B/I_A$ was 0.50.

Example 1

An evaluation battery was produced by using the electrolytic powder obtained in Production Example 1. First, Li foil (manufactured by Honjo Chemical Corporation) stuck to In foil (φ 10 mm, a thickness of 0.1 mm, manufactured by Nilaco Corporation) (LiIn foil) was prepared as a cathode active material layer. Next, Si powder (manufactured by Kojundo Chemical Lab. Co., Ltd.) as an anode active material, the electrolytic powder obtained in Production Example 1, and a conductive material (DENKA BLACK™ manufactured by DENKI KAGAKU KOGYO KABUSHIKI KAISHA) were weighed so as to be Si powder: electrolytic powder:conductive material=78:17:5 at weight ratio, and mixed in an agate mortar. Thus, an anode mixture was obtained.

Next, 80 mg of $Li_3PS_4$ sulfide glass was added to a cylinder made of macole, and pressed at 1 ton/cm² to form a solid electrolyte layer. Next, 2 mg of the anode mixture was added to one surface of the solid electrolyte layer and pressed at 4 ton/cm² to form an anode active material layer on the solid electrolyte layer. Next, the LiIn foil was disposed on the other surface of the solid electrolyte layer, and pressed at 1 ton/cm² to obtain a power generating element. The power generating element was constrained at 6 Ncm to obtain an evaluation battery.

Example 2

An evaluation battery was obtained in the same manner as Example 1 except for replacing the electrolytic powder obtained in Production Example 1 with the electrolytic powder obtained in Production Example 2.

Comparative Example 1

Carbon powder (graphite) was used as an anode active material. This carbon powder and the electrolytic powder obtained in Production Example 1 were weighed so as to be carbon powder:electrolytic powder=50:50 at weight ratio, and mixed in an agate mortar. Thus, an anode mixture was obtained. An evaluation battery was obtained in the same manner as Example 1 except for using this anode mixture by 1.5 mg.

Comparative Example 2

Sn powder (manufactured by Kojundo Chemical Lab. Co., Ltd.) was used as an anode active material. This Sn powder and the electrolytic powder obtained in Production Example 1 were weighed so as to be Sn powder:electrolytic powder=90:10 at weight ratio, and mixed in an agate mortar. Thus, an anode mixture was obtained. An evaluation battery was obtained in the same manner as Example 1 except for using this anode mixture by 20 mg.

[Evaluations]

(1) Measurement of Reduction Potential and Action Potential

Figure 8:
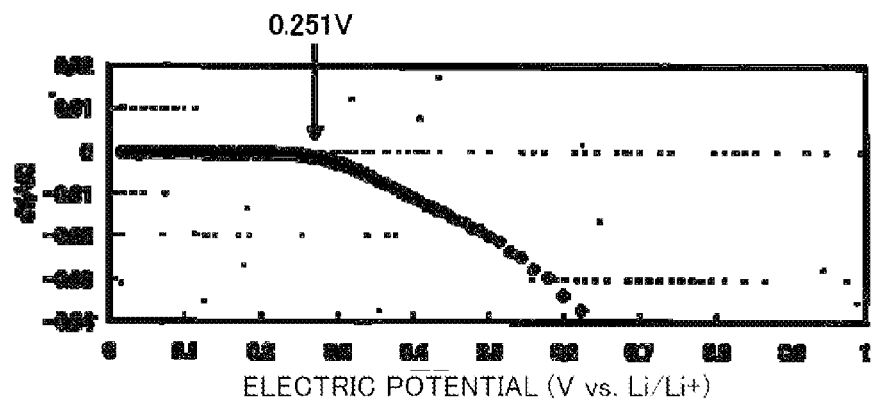
FIG. 8 is a result of measuring reduction potential of a Ge-containing solid electrolyte material obtained in Production Example 1.
Figure 9A:
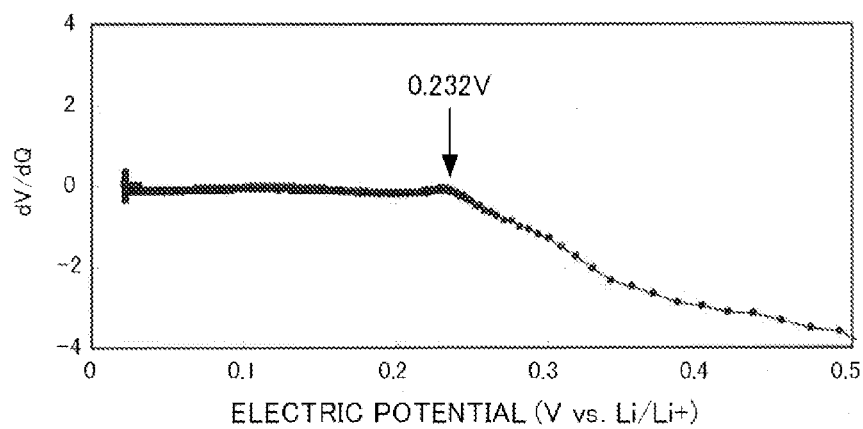
FIGS. 9A and 9B are results of measuring action potential of Si and C as an anode active material.
Figure 9B:
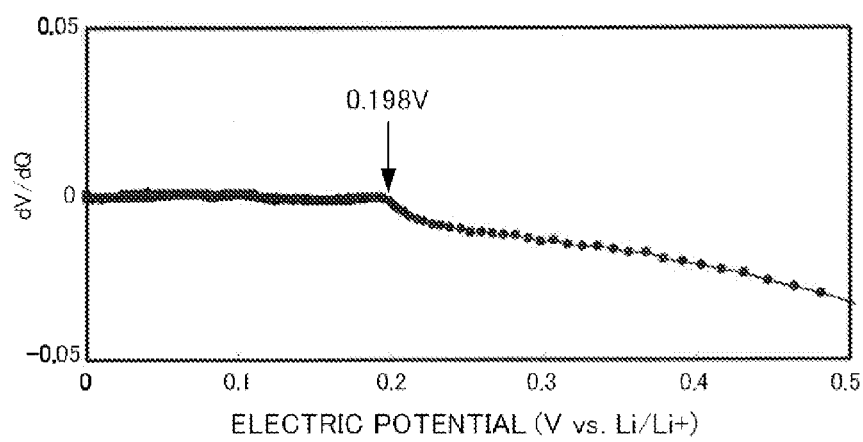

The reduction potential of the Ge-containing solid electrolyte material obtained in Production Example 1 was measured by the above-mentioned methods of (a) and (b). The result is shown in FIG. 8. As shown in FIG. 8, the reduction potential of the Ge-containing solid electrolyte material was 0.251 V (vs. Li/Li$^+$). On the other hand, the action potential of Si powder used in Example 1 and carbon powder used in Comparative Example 1 was measured by the above-mentioned methods of (c) and (d). The result is shown in FIG. 9. As shown in FIG. 9A, the action potential of Si powder was 0.232 V (vs. Li/Li$^+$); as shown in FIG. 9B, the action potential of carbon powder was 0.198 V (vs. Li/Li$^+$).

(2) Constant-Current Charge and Discharge Test

A constant-current constant-voltage charge and discharge test of 0.3 mA in a range of −0.60 V to 1 V (a range of 0.02 V to 1.62 V on the basis of lithium) was performed for the evaluation battery obtained in Examples 1 and 2. Incidentally, the constant-voltage value was 0.02 V (vs. Li/Li$^+$) during discharge and 1.62 V (vs. Li/Li$^+$) during discharge. Also, a constant-current charge and discharge test of 0.15 mA in a range of −0.62 V to 1 V (a range of 0.00 V to 1.62 V on the basis of lithium) was performed for the evaluation battery obtained in Comparative Example 1. Also, a constant-current charge and discharge test of 2 mA in a range of −0.62 V to 1 V (a range of 0.00 V to 1.62 V on the basis of lithium) was performed for the evaluation battery obtained in Comparative Example 2. The ratio of discharge capacity to charge capacity (discharge capacity/charge capacity) was regarded as charge and discharge efficiency (Coulombic efficiency). Also, charge and discharge behavior on the anode side was confirmed while using a reference electrode as a cathode. The results are shown in FIGS. 10 to 13.

Figure 10:
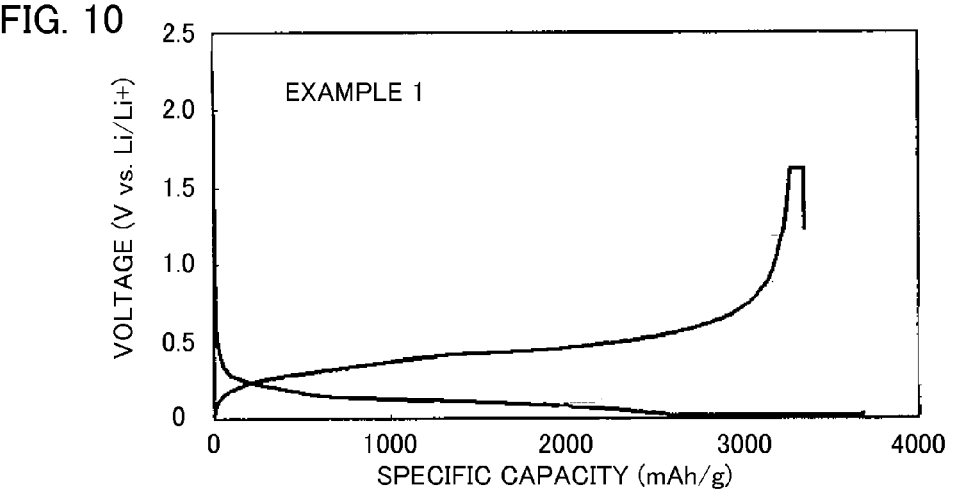
FIG. 10 is a charge and discharge curve of an evaluation battery obtained in Example 1.
Figure 11:
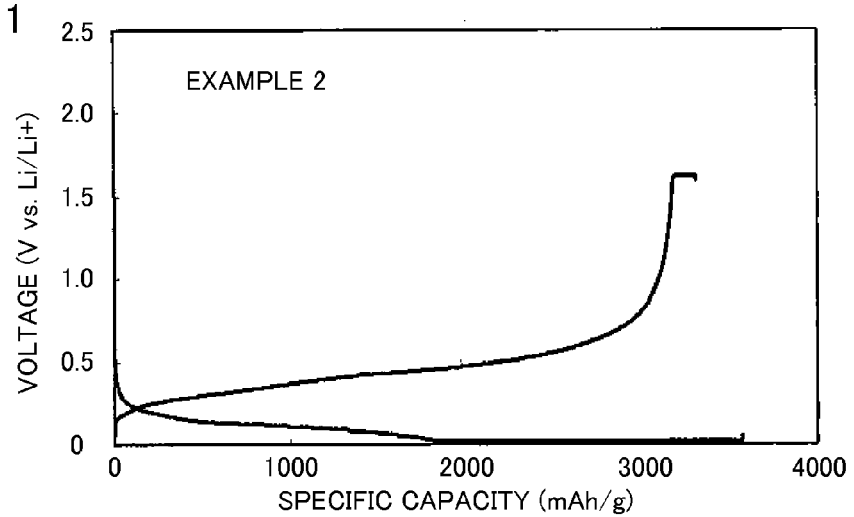
FIG. 11 is a charge and discharge curve of an evaluation battery obtained in Example 2.
Figure 12:
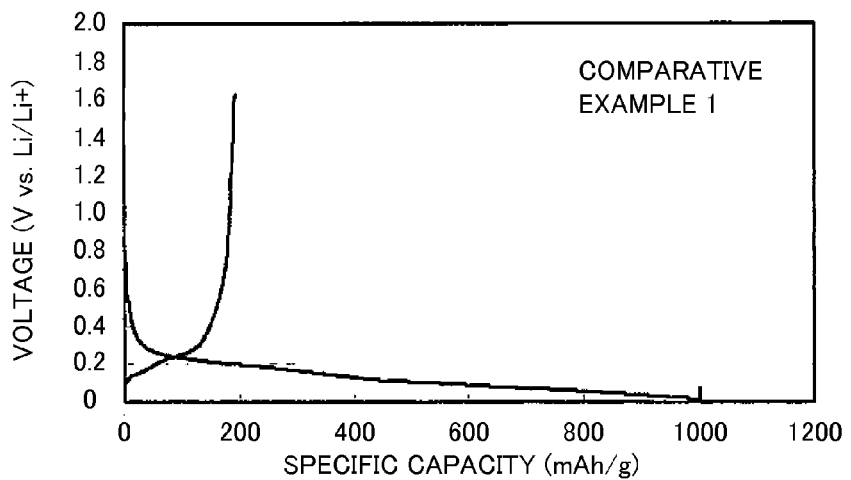
FIG. 12 is a charge and discharge curve of an evaluation battery obtained in Comparative Example 1.
Figure 13:
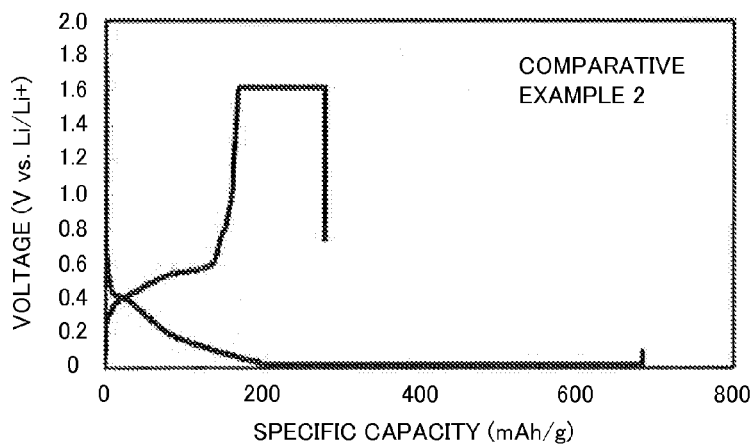
FIG. 13 is a charge and discharge curve of an evaluation battery obtained in Comparative Example 2.
Figure 14:
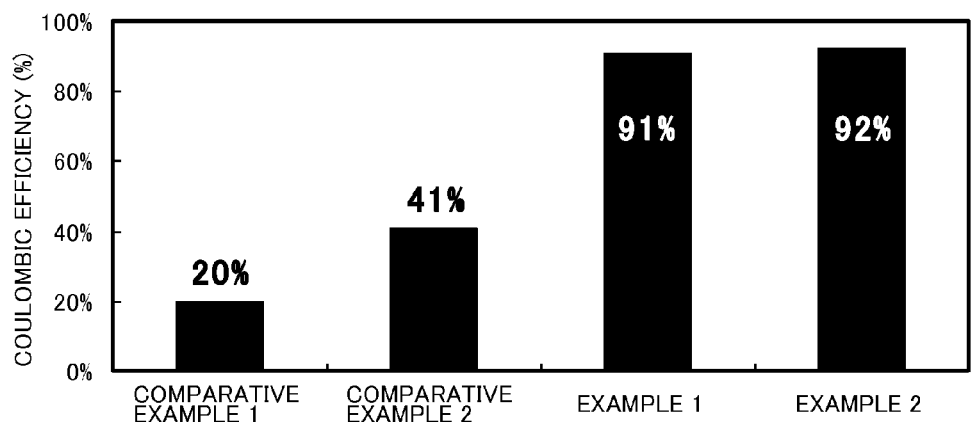
FIG. 14 is a result of charge and discharge efficiency of an evaluation battery obtained in Examples 1 and 2 and Comparative Examples 1 and 2.

FIGS. 10 to 13 are charge and discharge curves of the evaluation batteries obtained in Examples 1 and 2 and Comparative Examples 1 and 2 respectively, and FIG. 14 is a result of charge and discharge efficiency of the evaluation batteries obtained in Examples 1 and 2 and Comparative Examples 1 and 2. As shown in FIGS. 10 and 11, in Examples 1 and 2, a plateau portion was observed during charge in the vicinity of 0.232 V (vs. Li/Li$^+$) as the alloying potential (the action potential) of Li and Si, and a plateau portion was observed during discharge in the vicinity of 0.501 V (vs. Li/Li$^+$). In addition, Si having a theoretical capacity of 4200 mAh/g is used in Examples 1 and 2, and it may be confirmed that a very large capacity of 3000 mAh or more may be actually utilized reversibly. Also, as shown in FIG. 14, the charge and discharge efficiency of any of Examples 1 and 2 offered a high result of more than 90%. Thus, the combination of the Ge-containing solid electrolyte material with the Si-containing anode active material allowed ordinary operation as a battery to be confirmed even though an electric potential of the Si-containing anode active material was lowered to reduction potential or less of the Ge-containing solid electrolyte material. Also, in Examples 1 and 2, an electric potential of the Si-containing anode active material is lowered to approximately 0 V (vs. Li/Li$^+$), so that it is guessed that reductive decomposition of the Ge-containing solid electrolyte material is caused. However, Examples 1 and 2 offered favorable reversibility, so that it is conceived that reductive decomposition is restricted.

On the other hand, as shown in FIG. 12, in Comparative Example 1, a plateau portion was not confirmed during charge and the electric potential lowered rectilinearly from the vicinity of 0.25 V (vs. Li/Li$^+$). In addition, gradual potential change as observed in carbon was not observed. Also, the charge capacity was 1000 mAh/g, which greatly exceeded 370 mAh/g as a theoretical capacity of carbon. In addition, a plateau portion was not confirmed during discharge. Also, as shown in FIG. 14, the charge and discharge efficiency of Comparative Example 1 was as remarkably low as 20%. Thus, when an electric potential of the carbon-based anode active material was lowered to reduction potential or less of the Ge-containing solid electrolyte material while using the Ge-containing solid electrolyte material in combination with the carbon-based anode active material, no ordinary operation as a battery was confirmed.

Figure 15:
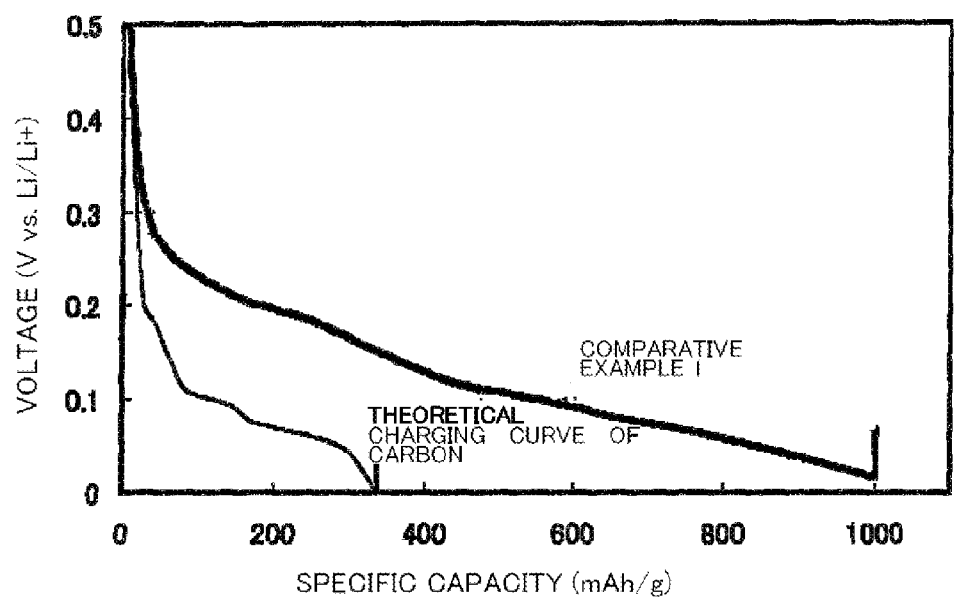
FIG. 15 is a charging curve of an evaluation battery obtained in Comparative Example 1.

FIG. 15 is a y-axis magnified view of FIG. 12 and a charging curve of the evaluation battery obtained in Comparative Example 1. Incidentally, a theoretical charging curve of carbon is shown while superposed. As shown in FIG. 15, it is conceived that the Ge-containing solid electrolyte material obtained in Production Example 1 causes a side reaction such as to consume electrical quantity at an electric potential of 0.25 V (vs. Li/Li$^+$) or less. That is to say, it is conceived that electrical quantity was consumed in the Ge-containing solid electrolyte material and an electrochemical reaction between carbon and Li ion did not proceed.

Also, as shown in FIG. 13, in Comparative Example 2, a plateau portion was observed during charge in the vicinity of 0.354 V (vs. Li/Li$^+$) as the alloying potential (the action potential) of Li and Sn, and a plateau portion was observed during discharge in the vicinity of 0.614 V (vs. Li/Li$^+$). Also, as shown in FIG. 14, the charge and discharge efficiency of Comparative Example 2 was as low as 41%.

REFERENCE SIGNS LIST 1 cathode active material layer
2 anode active material layer
3 electrolyte layer
4 cathode current collector
5 anode current collector
6 battery case
10 battery
11 Ge-containing solid electrolyte material 12 Si-containing anode active material
20 control apparatus
30 battery system

The invention claimed is:

1. A battery system comprising:
    a battery comprising:
        a cathode active material layer containing a cathode active material;
        an anode active material layer containing a Si-containing anode active material; and
        a solid electrolyte layer formed between the cathode active material layer and the anode active material layer,
        wherein at least one of the anode active material layer and the solid electrolyte layer comprises a Ge-containing solid electrolyte material having a Li element, a Ge element, a P element, and a S element; and
    a control apparatus that controls an electric potential of the Si-containing anode active material so as to be reduction potential or less of the Ge-containing solid electrolyte material.

2. The battery system according to claim 1, wherein the control apparatus comprises a switch part to cut off electric current of the battery, and controls the switch part so as to continue charge until the electric potential of the Si-containing anode active material becomes smaller than the reduction potential of the Ge-containing solid electrolyte material in the case where charge is started when the electric potential of the Si-containing anode active material is larger than the reduction potential of the Ge-containing solid electrolyte material.

3. The battery system according to claim 1, wherein the Ge-containing solid electrolyte material has a peak at a position of 2θ=29.58°±0.50° in X-ray diffraction measurement using a CuKα line, and a value of $I_B/I_A$ is less than 0.50,
    wherein $I_A$ represents a diffraction intensity at the peak of 2θ=29.58°±0.50° and $I_B$ represents a diffraction intensity at a peak of 2θ=27.33°±0.50°.

4. The battery system according to claim 1, wherein:
    the Ge-containing solid electrolyte material has an octahedron O composed of an $M_1$ element and a S element, a tetrahedron $T_1$ composed of an $M_{2a}$ element and a S element, and a tetrahedron $T_2$ composed of an $M_{2b}$ element and a S element,
    the tetrahedron $T_1$ and the octahedron O share an edge,
    the tetrahedron $T_2$ and the octahedron O comprise a crystal structure sharing a corner as a main body,
    the $M_1$ is Li,
    the $M_{2a}$ and the $M_{2b}$ are each independently at least one of P and Ge, and
    at least one of the $M_{2a}$ and the $M_{2b}$ comprises Ge.

5. The battery system according to claim 1, wherein the control apparatus controls the electric potential of the Si-containing anode active material so as to be 0.25 V (vs. Li/Li$^+$) or less.

6. The battery system according to claim 1, wherein the Si-containing anode active material is Si.

7. The battery system according to claim 1, wherein:
    the solid electrolyte layer comprises the Ge-containing solid electrolyte material, and
    the Ge-containing solid electrolyte material comprised in the solid electrolyte layer contacts with the Si-containing anode active material comprised in the anode active material layer.

8. A method for producing a battery system, the method comprising:
    assembling a battery, the battery comprising:
        a cathode active material layer containing a cathode active material,
        an anode active material layer containing a Si-containing anode active material, and
        a solid electrolyte layer formed between the cathode active material layer and the anode active material layer,
        wherein at least one of the anode active material layer and the solid electrolyte layer comprises a Ge-containing solid electrolyte material having a Li element, a Ge element, a P element, and a S element; and
    installing a control apparatus to control an electric potential of the Si-containing anode active material so as to be reduction potential or less of the Ge-containing solid electrolyte material.

9. A battery control apparatus configured to control an electric potential of a Si-containing anode active material so as to be reduction potential or less of a Ge-containing solid electrolyte material with respect to a battery, the battery having a cathode active material layer containing a cathode active material, an anode active material layer containing the Si-containing anode active material, and a solid electrolyte layer formed between the cathode active material layer and the anode active material layer, wherein at least one of the anode active material layer and the solid electrolyte layer comprises the Ge-containing solid electrolyte material having a Li element, a Ge element, a P element, and a S element.

* * * * *